Aug. 1, 1933.  C. LORBER  1,920,704
TRACING CHART
Filed Oct. 17, 1932   2 Sheets-Sheet 1

Inventor
Charles Lorber
By *E. H. Clarkson*
Attorney

Aug. 1, 1933.　　　　　C. LORBER　　　　　1,920,704
TRACING CHART
Filed Oct. 17, 1932　　　2 Sheets-Sheet 2

Inventor
Charles Lorber
By　Clarkson
Attorney

Patented Aug. 1, 1933

1,920,704

UNITED STATES PATENT OFFICE 1,920,704

TRACING CHART

Charles Lorber, Louisville, Ky.

Application October 17, 1932. Serial No. 638,245

4 Claims. (Cl. 35—8)

This invention relates to educational devices and has special reference to tracing chart pads.

More particularly the invention relates to improvements in the educational device illustrated and described in my copending application for patent on tracing chart, filed December 22, 1931, Serial number 582,625, and which was issued on Nov. 8, 1932, as Patent Number 1,887,160.

In the forms of the invention shown and described in the aforementioned copending application it will be noted that each sheet of the tracing paper used is arranged to form an individual envelope. For certain educational purposes it is desirable to provide the student, at one time, with a number of sheets of the tracing paper and it is preferable, under such conditions, to bind the various sheets together in some manner to prevent loss and wrinkling through careless handling. Envelopes of the type shown in said application do not readily lend themselves to being bound and require considerable more paper than if single sheets are used.

I have discovered that it is possible to so assemble a multiplicity of single sheets in pad form, bound or unbound, in such manner as to make each individual sheet a copy sheet and to make the space between successive sheets fully equivalent to an envelope so that, for the purposes of this invention each two successive sheets will be termed the front and back of an envelope thereby eliminating loss and injury to the sheets and effecting great economy in the use of the tracing paper as well as enabling a permanent record of the student's work to be kept.

One important object of the invention is, therefore, to provide a novel arrangement of transparent tracing sheets in pad form associated with a tracing chart proper bearing characters to be traced, the padding of the tracing sheets being such as to permit the chart to be inserted between two of the tracing sheets and to permit tracing to be performed on the upper of the two sheets.

A second important object of the invention is to provide a pad of this character wherein assembled tracing sheets are so arranged that they form in effect the front of one envelope and the back of the next preceding envelope.

A third important object of the invention is to so pad and bind such tracing sheets that, after use, they may be retained in the binding used while freed from other connection with the remaining and unused sheets.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

In each embodiment of the invention as herein disclosed there is provided a pack or pad 10 consisting of a multiplicity of superposed tracing sheets. These tracing sheets are preferably of thin transparent paper and are of such character that an object placed beneath a sheet is plainly visible. Moreover, the tracing sheets are also of such character as to readily receive marks made by a writing or drawing implement such as a pen. Accordingly, whenever, in the specification and claims, tracing sheets are mentioned it is to be understood that these are transparent sheets readily receiving marks made by a writing or drawing implement. Associated with these sheets is a tracing chart 11 preferably of cardboard and having characters 12 impressed thereon so as to be plainly visible through a tracing sheet. As here shown the characters 12 are those of the written alphabet but it is to be distinctly understood that the invention is not restricted to the specific characters here shown but the tracing chart may be arranged with any desired characters or illustrations to be traced such as geometrical forms, representations of natural objects and the like. Moreover, in commercial distribution it is proposed to associate with each pad of tracing sheets a number of tracing charts each being different from the others so that such charts may be arranged to form successive steps in instruction. For instance, in the teaching of writing the chart shown may be preceded by one or more bearing elementary letter forms such as lines and loops and may be followed by charts bearing combinations of letters, words and sentences successively. However, it is not deemed necessary to illustrate such charts as the invention does not reside in the character of the matter to be traced or in the number of charts to be used.

Figure 1:
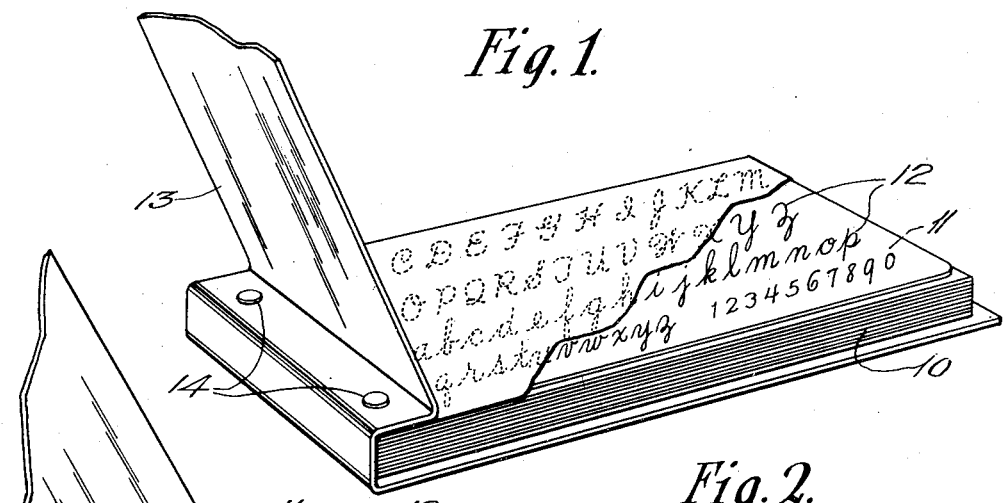
Figure 1 is a perspective view, partly broken away, showing one form of the invention in which the sheets are held in a binder.

In the form of the invention shown in Figure 1 the pad 10 is bound in a binder 13, here shown as of the so-called "loose-leaf" type, the sheets being held in the binder by the fasteners 14. In this form the chart 11 is first inserted beneath the uppermost sheet and is traced on that sheet. After the sheet is used it may be torn out at the bound edge or may be folded back against the front cover of the binder if a permanent record is desired. The chart is then placed beneath the next sheet and this process is continued until all the sheets are used.

Figure 2:
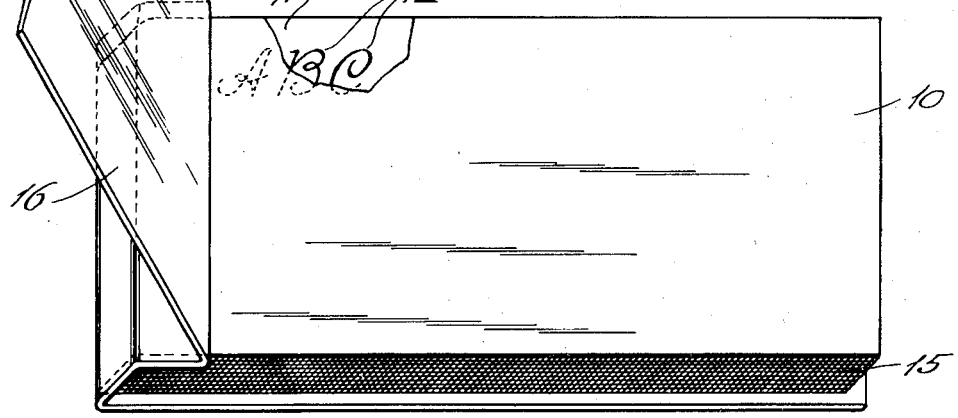
Figure 2 is a similar view of a second bound form of the invention.

In the form shown in Figure 2 the pad 10 has the lower edges of the sheets coated as at 15 with a suitable adhesive such as is commonly used for padding piles of sheets. A binder 16 is used to hold this pad, the pad being held by one end as shown. In this form there is thus provided a multiplicity of envelopes, the upper sheet forming the front and the next sheet the back for each envelope and these envelopes are open at the top and right edge for the insertion of the tracing chart 11. This form is used in a manner similar to that previously described but it will be obvious that, as each sheet is used it is separated at the bottom from the remainder of the pad in any of the usual ways, for instance by running a pencil along the bottom edge between the top sheet and that next below.

Figure 3:
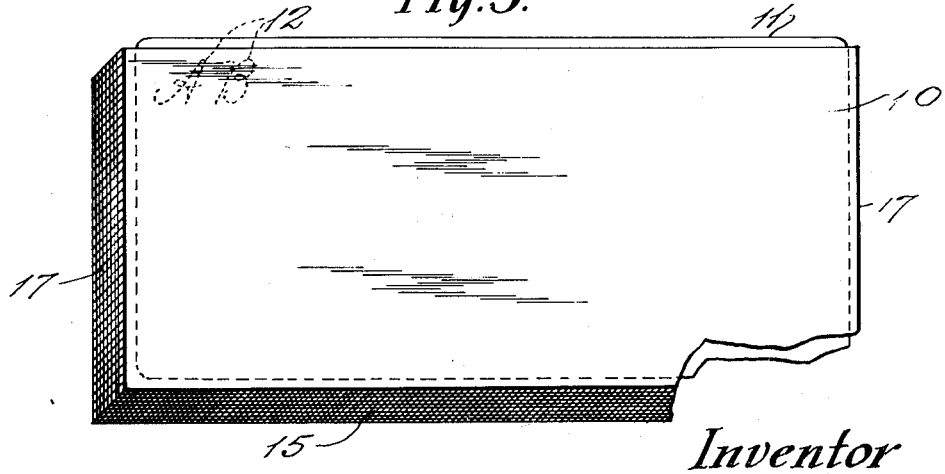
Figure 3 is a perspective view, partly broken away and showing one form of unbound pad as used in connection with the invention.

In the form shown in Figure 3, the binder is eliminated but, in addition to the adhesive 15, an end of the pad is provided with adhesive 17 to bind the sheets together at the ends just as the binder 16 acts in the form shown in Figure 2. Obviously, the pad is used as in the last form.

Figure 4:
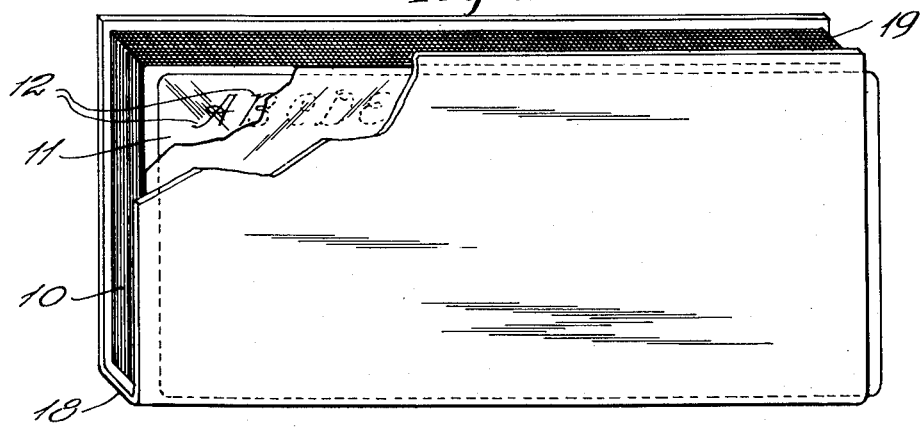
Figure 4 is a view similar to Figure 1 showing a second modification of the bound form of the tracing sheets pad.

In the form shown in Figure 4 the binder 18 is applied to one edge of the pad 10 and the opposite edge is provided with adhesive 19 so that the envelopes formed are open at two opposite edges and the chart 11 is inserted by slipping in from one of the open edges. The use is the same as in the preceding forms.

Figure 5:
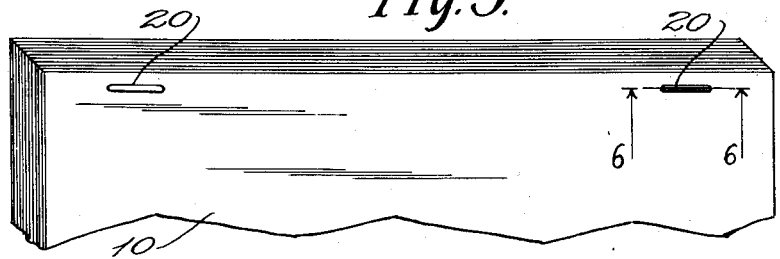
Figure 5 is a perspective view of part of a pad of tracing sheets with the sheets secured together by staples.
Figure 6:
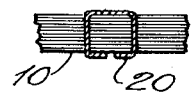
Figure 6 is a section on the line 6—6 of Figure 5.
Figure 7:
Figure 7 is a view similar to Figure 6 but showing the sheets held together by screws and nuts.
Figure 8:
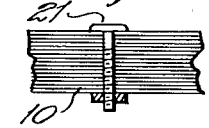
Figure 8 is a section on the line 8—8 of Figure 7.
Figure 9:
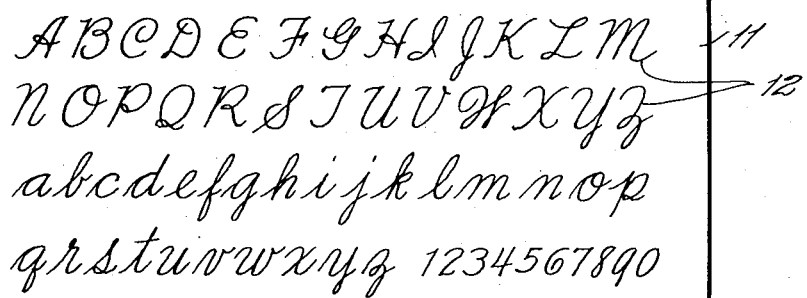
Figure 9 is a face view of a tracing chart suitable for use herewith.

In Figures 5 and 6 the use of adhesive is eliminated and the sheets of the pad 10 are held together by staples 20 while in Figures 7 and 8 the staples are replaced by screw and nut fastenings 21 such as are used in connection with the binding of loose leaves.

Obviously other means, not deemed necessary to be here shown, may be used to hold the tracing sheets in pad form. For instance, ribbons or laces may be used to hold the sheets together.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. The combination for use with a grooved tracing chart; of a pad consisting of a multiplicity of sheets of transparent tracing paper permanently bound together at one edge and adhesively detachably connected together along a second edge to form a multiplicity of superposed casings.

2. The combination for use with a grooved tracing chart; of a pad consisting of a multiplicity of sheets of transparent tracing paper permanently bound together at one edge and adhesively detachably connected together along a second edge to form a multiplicity of superposed pockets, the adhesively secured edge being adjacent the permanently bound edge whereby a chart placed in a pocket may be held in definite position in two directions by engagement with the bound and secured edges.

3. The combination for use with a grooved tracing chart; of a pad consisting of a multiplicity of sheets of transparent tracing paper permanently bound together at one edge and detachably connected together along a second edge to form a multiplicity of superposed casings.

4. The combination for use with a grooved tracing chart; of a pad consisting of a multiplicity of sheets of transparent tracing paper permanently bound together at one edge and detachably connected together along a second edge to form a multiplicity of superposed pockets, the detachably secured edge being adjacent the permanently bound edge whereby a chart placed in a pocket may be held in definite position in two directions by engagement with the bound and secured edges.

CHARLES LORBER.